(12) United States Patent
Taira et al.

(10) Patent No.: US 8,430,073 B2
(45) Date of Patent: Apr. 30, 2013

(54) INTAKE MANIFOLD FOR MULTIPLE-CYLINDER INTERNAL COMBUSTION ENGINE

(75) Inventors: Takahiro Taira, Saitama (JP); Shojiro Fukuda, Tochigi (JP); Masato Hayashi, Tochigi (JP)

(73) Assignees: Honda Motor Co. Ltd., Tokyo (JP); Keihin Corporation, Tokyo (JP)

( * ) Notice: Subject to any disclaimer, the term of this patent is extended or adjusted under 35 U.S.C. 154(b) by 73 days.

(21) Appl. No.: 12/530,755

(22) PCT Filed: Mar. 12, 2008

(86) PCT No.: PCT/JP2008/054464
§ 371 (c)(1),
(2), (4) Date: Sep. 10, 2009

(87) PCT Pub. No.: WO2008/126585
PCT Pub. Date: Oct. 23, 2008

(65) Prior Publication Data
US 2010/0116237 A1    May 13, 2010

(30) Foreign Application Priority Data
Mar. 15, 2007 (JP) .................................. 2007-067544

(51) Int. Cl.
*F02M 35/10* (2006.01)
(52) U.S. Cl.
USPC ............ 123/184.21; 123/184.34; 123/184.42; 123/184.47; 123/184.53
(58) Field of Classification Search ............. 123/184.42, 123/184.61, 184.62, 184.34, 184.55, 184.56, 123/559.2, 478, 520, 681
See application file for complete search history.

(56) References Cited

U.S. PATENT DOCUMENTS

| 5,005,532 | A  | * | 4/1991  | Shillington    | 123/184.42 |
|-----------|----|---|---------|----------------|------------|
| 5,537,965 | A  | * | 7/1996  | Topfer et al.  | 123/184.42 |
| 6,805,089 | B2 | * | 10/2004 | Kemper et al.  | 123/184.61 |
| 2001/0022167 | A1 | * | 9/2001 | Brassell et al. | 123/184.42 |
| 2009/0133658 | A1 | * | 5/2009 | Fukuda et al.   | 123/184.61 |
| 2010/0095921 | A1 | * | 4/2010 | Taira           | 123/184.21 |

FOREIGN PATENT DOCUMENTS

| DE | 103 00 809 A1 | 7/2004 |
| FR | 2 853 694 A1 | 10/2004 |
| JP | 2002-089272 A | 3/2002 |
| JP | 2002-195115 A | 7/2002 |
| JP | 2002-361745 A | 12/2002 |
| JP | 2003074431 A | 3/2003 |

* cited by examiner

*Primary Examiner* — Marguerite McMahon
*Assistant Examiner* — James Kim
(74) *Attorney, Agent, or Firm* — Arent Fox LLP

(57) ABSTRACT

An intake manifold for a multiple-cylinder internal combustion engine has a collective part forming an intake gas distribution chamber, and a branch part forming branch intake passages. The collective part includes a first section defining a first space joined to a second section defining a second space. The first and second spaces define the intake gas distribution chamber. The first and second sections have corner parts, the second section being provided with a guide wall covering the inside surfaces of the corner parts. The guide wall has a guide surface and opposes the intake gas inlet, the intake gas distribution chamber being defined between the intake gas inlet and the guide wall. The guide wall and the corner parts define a back space communicating with the intake gas distribution chamber.

9 Claims, 3 Drawing Sheets

Cylinder arranging direction

Cylinder arranging direction

US 8,430,073 B2

INTAKE MANIFOLD FOR MULTIPLE-CYLINDER INTERNAL COMBUSTION ENGINE

CROSS-REFERENCE TO RELATED APPLICATION

This application is a National Stage entry of International Application No. PCT/JP2008/054464, having an international filing date of Mar. 12, 2008; which claims priority to Japanese Application No.: 2007-067544, filed Mar. 15, 2007.

TECHNICAL FIELD

The present invention relates to an intake manifold, for a multiple-cylinder internal combustion engine, having a collective part forming an intake gas distribution chamber, and a plurality of branch intake pipes branching out from the collective part and forming branch intake passages for carrying an intake gas to combustion chambers.

BACKGROUND ART

An intake manifold, for a multiple-cylinder internal combustion engine is disclosed in, for example, Patent Document 1, which intake manifold is provided with a guide to ensure smooth flow of intake gas from the intake manifold to the combustion chambers.

Patent Document 1: JP 2003-74431 A

DISCLOSURE OF THE INVENTION

Underlying Problem to be Solved by the Invention

In some intake manifold, for a multiple-cylinder internal combustion engine, having a collective part forming an intake gas distribution chamber and provided with an intake inlet, and a plurality of branch intake pipes branching out from the collective part and forming a plurality of branch intake passages branching out from the intake gas distribution chamber, corners of the collective part are formed in a special shape, such as a squarish shape, to ensure a sufficient rigidity for the collective part to which a negative intake pressure acts. When the branch intake pipes are formed integrally with the collective part, the shape of the collective part is determined so as to be easily molded to facilitate removing a mold core for molding the branch intake pipes and to avoid increasing the cost of the intake manifold due to the complicated shape of the mold. In some cases, the corners need to be formed in a special shape, such as a squarish shape, to prevent interference between the core and the collective part.

However, a shape of the collective part determined from the viewpoint of rigidity and molding sometimes obstructs the smooth flow of intake gas in the collective part reducing the volumetric efficiency of the engine.

The present invention has been made in view of such a problem and it is therefore an object of the present invention to provide an intake manifold having a collective part of split case construction ensuring smooth flow of intake gas therethrough to improve volumetric efficiency regardless of the shape of corners of the collective part and to suppress the variation of pressure in the intake gas distribution chamber. Another object of the present invention is to prevent complicating the structure of a mold for forming the branch intake pipes defining branch intake passages integrally with the collective part.

Means to Solve the Underlying Problem

The present invention provides an intake manifold, for a multiple-cylinder internal combustion engine, having a collective part forming an intake gas distribution chamber having an intake gas inlet, and a branch part having a plurality of branch intake passages respectively for carrying an intake gas to combustion chambers; wherein the collective part is built by joining together first and second sections respectively defining first and second spaces forming the intake gas distribution chamber, at least the first section is integrally provided with a corner part, the second section is provided with a guide wall extending in the first and the second section so as to cover the inside surface of the corner part, the guide wall has a guide surface for guiding the intake gas more smoothly than the inside surface of the corner part, and the guide wall and the corner part define a back space communicating with the intake gas distribution chamber.

Preferably, the branch part is formed integrally with the first section, the guide wall lies in an imaginary extension passage on the extension of the branch intake passage, and the corner part of the first section lies outside a region corresponding to the imaginary extension passage.

A rib may be provided in the back space to connect the guide wall and the corner part.

Effects of the Invention

In the intake manifold according to the present invention, the collective part is a split case structure including the first and the second section. Therefore, even if a corner is formed at least in the first section to provide the collective part with a high rigidity, the intake gas can flow smoothly through the intake gas distribution chamber regardless of the shape of the corner owing to the agency of the guide wall of the second section. Since the guide wall extends between the first and the second sections in the intake gas distribution chamber, the intake gas can flow smoothly in a wide region in the intake gas distribution chamber and hence the volumetric efficiency can be improved.

Since the back space defined by the guide wall and the corner part communicates with the intake gas distribution chamber, the volume of the intake gas distribution chamber is increased by the volume of the back space, and the variation of pressure in the intake gas distribution chamber can be suppressed by using the back space to improve volumetric efficiency.

Even though the branch part having the branch intake passages is formed integrally with the first section, the core for forming the branch intake passages can be removed without being obstructed by the guide wall and the corner part of the first section. Therefore, the mold for forming the branch part integrally with the collective part is not complicated and it is possible to avoid increasing the cost of the intake manifold.

DESCRIPTION OF THE REFERENCE SIGNS

10 . . . Collective part, 11 . . . Intake gas distribution chamber, 20 . . . Branch intake part, 22 . . . Branch intake passage, 31 . . . Corner part, 40 . . . Guide wall, 44 . . . Guide surface, 45 . . . Rib, 47 . . . Back space M . . . Intake manifold, A . . . First section, B . . . Second section

BEST MODE FOR CARRYING OUT THE INVENTION

Embodiments of the invention will be described with reference to the drawings.

Figure 1:
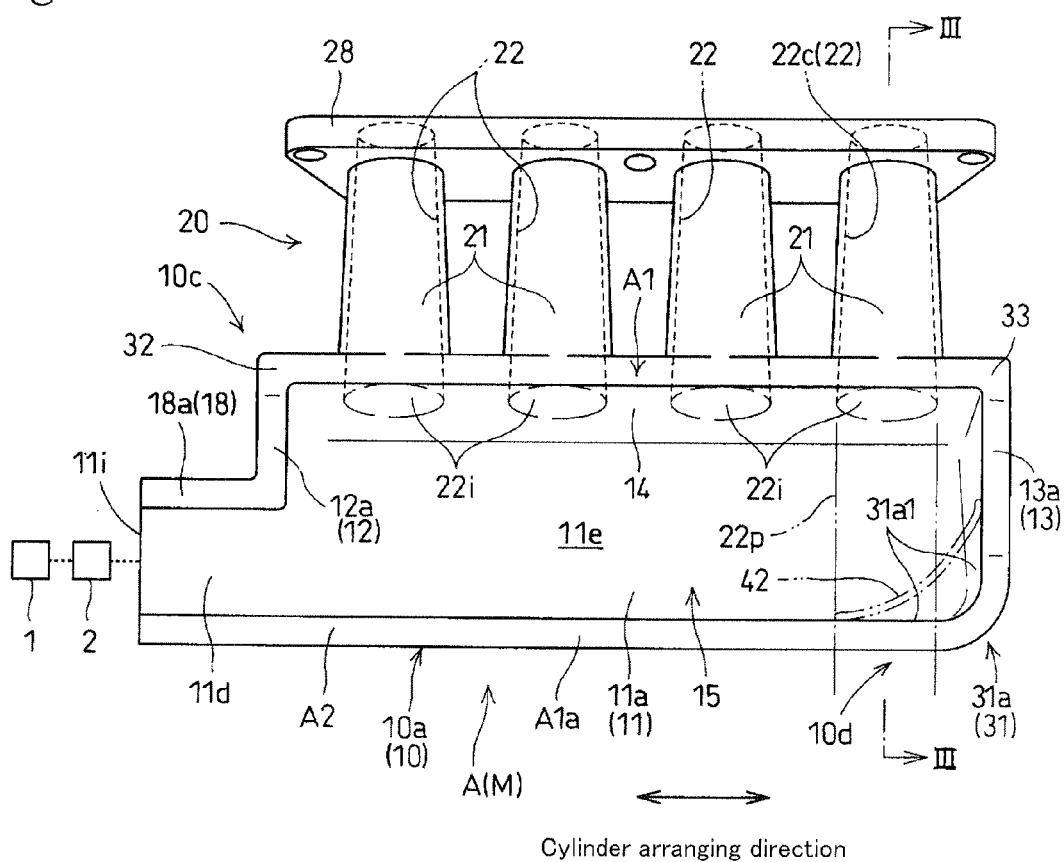
FIG. 1 is a plan view of a first section of an intake manifold to which the present invention is applied, taken from the side of a joining surface of the first section.
Figure 2:
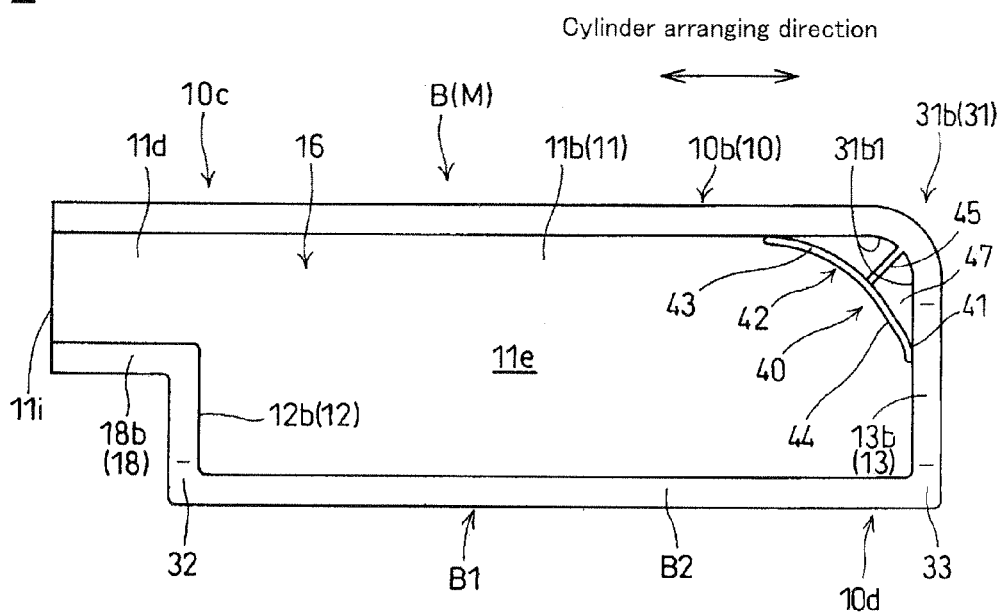
FIG. 2 is a plan view of a second section of the intake manifold, taken from the side of a joining surface of the second section.
Figure 3:
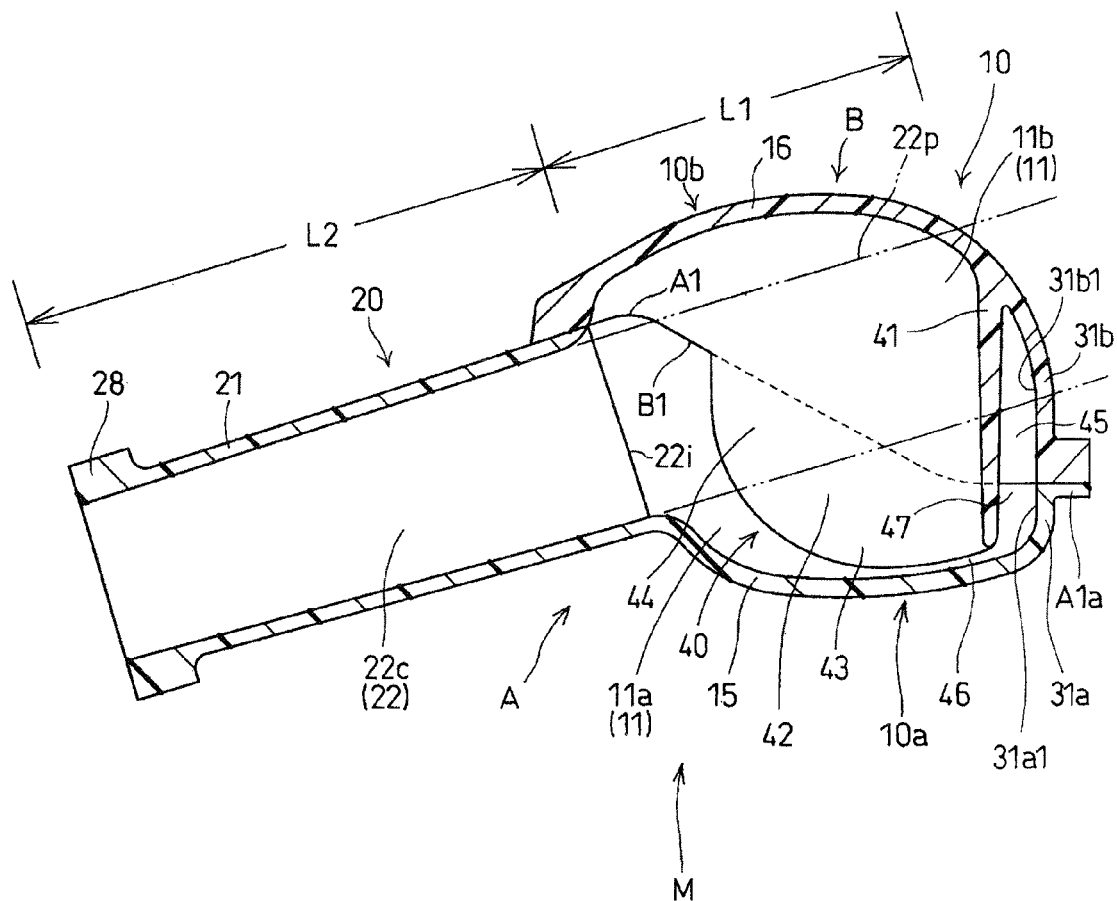
FIG. 3 is a sectional view taken on the line in FIG. 1.

Referring to FIGS. 1, 2 and 3, an intake manifold M in a preferred embodiment of the present invention is intended to be combined with an inline four-cylinder internal combustion engine, namely, a multiple-cylinder internal combustion engine for a vehicle. The internal combustion engine has an engine body including a cylinder block integrally provided with a plurality of cylinders (four cylinders in this embodiment) in a straight arrangement, a cylinder head joined to the cylinder block, a cylinder head joined to the cylinder block, and a head cover joined to the cylinder head.

The internal combustion engine is provided with pistons fitted in the cylinders so as to reciprocate in the cylinders, a crankshaft driven for rotation by the pistons driven by the pressure of a combustion gas generated in combustion chambers, and rotatably supported on the cylinder block, an intake system for supplying intake gas into the combustion chambers, an exhaust system for carrying the combustion gas as an exhaust gas from the combustion chambers to the outside of the internal combustion engine. Each of the combustion chambers is defined by the cylinder, the piston fitted in the cylinder, and the cylinder head.

Referring to FIG. 1, the intake system includes an air cleaner 1 for cleaning intake gas, a throttle device 2 provided with a throttle valve for controlling the flow of intake gas containing air from the air cleaner 1, and the intake manifold M for carrying the intake gas that has passed through the throttle device 2 into the combustion chambers.

The intake gas that flows through the intake passage in the intake system is sucked through intake ports formed in the cylinder head into the combustion chambers. The intake gas is an air-fuel mixture when fuel is supplied into intake air in the intake system or intake air when fuel is supplied directly into the combustion chambers.

In this specification, "upstream" and "downstream" are used to indicate directions and positions with respect to the flowing direction of the intake gas.

Referring to FIG. 1, the intake manifold M has a collective part 10 defining an intake gas distribution chamber 11 into which the intake gas from the throttle device 2 flows, a branch intake part 20 branching out from the collective part 10 and defining branch intake passages 22 for carrying the intake gas into the combustion chambers, and a downstream flange 28, namely, a downstream joining part.

Downstream intake pipes, not shown, defining downstream branch intake passages to be connected respectively to the branch intake passages 22 are connected to the downstream flange 28. The downstream intake pipes are connected to the cylinder head. When the internal combustion engine is so designed that the downstream flange 28 is connected to the cylinder head, the downstream intake pipes may be omitted.

The collective part 10 has end walls 12 and 13 longitudinally opposite to each other with respect to the cylinder arranging direction, namely, a horizontal direction in FIGS. 1 and 2, a downstream side wall 14 in which the inlets 22i of the branch inlet passages 22 open, a first wall 15, and a second wall 16. The intake gas distribution chamber 11 is defined by integrally forming those walls 12 to 16. The intake gas distribution chamber 11 has an inlet passage 11d having an inlet 11i, and an enlarged chamber 11e.

An upstream connecting part 18 is formed at one end 10c of the collective part 10 with respect to the cylinder arranging direction. The throttle device 2 has a throttle body defining an intake passage in which the throttle valve is disposed. The upstream connecting part 18 connects to the throttle body. The upstream connecting part 18 defines the inlet passage 11d having the inlet 11i. The upstream connecting part 18 is an inlet part of the collective part 10.

A squarish corner part 31 is formed at the other end 10d of the collective part 10 with respect to the cylinder arranging direction. Squarish corner parts 32 and 33 similar to the corner part 31 are formed continuously with the downstream side wall 14. The corner parts 31 to 33 enhance the rigidity of the collective part 10 to which a negative pressure acts. Generally, the inner corners of the corner parts 31 to 33 are rounded in curved surfaces of a small radius of curvature. Those inner corners may be scarcely rounded square corners.

The collective part 10 is a split case structure having a first section A having a joining surface A2, and a second section B having a joining surface B2. The joining surfaces A2 and B2 are joined to complete the collective part 10. The first section A and the second section B define a first space 11a and a second space 11b, respectively. When the first section A and the second section B are joined together, the spaces 11a and 11B form the intake gas distribution chamber 11. The first section A and the second section B are formed individually by molding a synthetic resin in a mold. Edges A1 and B1 respectively having the joining surfaces A2 and B2 are joined together by welding, namely, a joining means.

The first section A is a unitary structure including a first end wall 12a, namely, one of parts of the end wall 12, the downstream side wall 14, the first wall 15, a first end wall 13a, namely, a part of the end wall 13, the branch intake part 20 having the branch intake passages 22 forming the four branch intake passages 22 arranged in the cylinder arranging direction, a first corner part 31a, namely, a part of the corner pat 31, and the downstream flange 28. The first end wall 12a, the first end wall 13a, the downstream side wall 14, and the first wall 15 form a first collective part 10a defining a first chamber 11a. A first collective part 10a forming a first space 11a is defined by the first end wall 12a, the first end wall 13a, the downstream side wall 14 and the first wall 15.

To the first end wall 12a is integrally formed a first connecting part 18a which is a part of the connecting part 18. The first corner part 31a is located upstream of the downstream side wall 14 and formed by the first wall 15 and the first end wall 13a. The first corner part 31a enhances the rigidity of the first collective part 10a.

The branch intake part 20 is formed by integrally collecting intake pipes 21 respectively defining the branch intake passages 22. The branch intake passages 22 are tapered downstream so that its cross-sectional area decreases toward the downstream side. The branch intake passages 22 are formed by a mold core when the first section A is molded in a mold. The mold core is pulled or removed toward the upstream side or removed into the first space 11a, i.e., into the intake gas distribution chamber 11, along imaginary extension passages 22p parallel to the branch intake passages 22 to pull out the core from the branch intake passages 22. In FIGS. 1 and 3, only the imaginary extension passage 22p on the extension of the branch intake passage 22c is indicated by two-dot chain lines. The first corner part 31a, and a first edge part A1a of the edge A1 of the first wall 15 are not on the imaginary extension passage 22p and are in a region outside the imaginary extension passage 22p.

As shown in FIG. 3, the length L2 of the branch intake passages 22 is longer than a distance L1 along the imaginary extension passage 22p between the inlet 22i and the first corner part 31a or between the inlet 22i and the first edge part A1a.

The second section B shown in FIG. 2 is a unitary case structure including a second end wall 12b joined to the first end all 12a to form the end wall 12, the second wall 16, a second end wall 13b joined to the first end wall 13a to form the end wall 13, a second corner part 31b joined to the first corner part 31a to form the corner part 31, a guide wall 40 for guiding the intake gas so as to flow smoothly in the intake gas distribution chamber 11, and a second connecting part 18b joined to the first connecting part 18a to form the connecting part 18. The second end wall 12b, the second end wall 13b, the second wall 16 form a second collective part 10b defining a second chamber 11b.

The second corner part 31b enhances the rigidity of the second collective part 10b. When the first wall 15, namely, the bottom wall of the collective part 10, and the second wall 16, namely, the top wall of the collective part 10, are joined together, an upstream side wall is formed opposite to the downstream side wall 14 with respect to a direction in which the branch intake passages 22 extend.

The guide wall 40 has the shape of a plate curved in the shape of a circular arc. The guide wall 40 is formed integrally with the second collective part 10b so as to extend between the second end wall 13b and the second wall 16. The guide wall 40 covers the inside surface 31b1 of the second corner part 31b of the second section B. The guide wall 40 extends from the second end wall 13b and the second wall 16 beyond the edge B1 toward the first corner part 31a.

In the intake manifold M formed by joining together the first section A and the second section B, the guide wall 40 extends in the interior of the second section B or the second space 11b into the interior of the first section A or the first space 11a. The guide wall 40 covers the inside surface 31a1 of the first corner part 31a. The guide wall 40 is extended close to the first wall 15 such that a small gap 46 is formed between the free end 43 of the guide wall 40 and the first wall 15 as shown in FIG. 3.

The guide wall 40 has connecting parts 41 connected to the second end wall 13b and the second wall 16, and a curved part 42 spaced apart from the inside surfaces 31a1 and 31b1 of the corner part 31. The connecting parts 41 are connected to the second end wall 13b, and the second wall 16 in an airtight manner. Since the curved part 42 is spaced apart from the corner part 31, a back space 47 of a volume smaller than that of the intake gas distribution chamber 11 is defined by the guide wall 40 and the corner part 31. The back space 47 communicates with the intake gas distribution chamber 11 by means of the gap 46. Thus the corner part 31 protrudes from the guide wall 40 on the outer side of the intake gas distribution chamber 11.

The maximum curvature of a guide surface 44 of the guide wall 40, which is a part of the inside surface of the intake gas distribution chamber 11, is smaller than those of the respective inside surfaces 31a1 and 31b1 of the corner parts 31a and 31b. Therefore, the guide surface 44 can guide the intake gas in the intake gas distribution chamber 11 more smoothly than the inside surfaces 31a1 and 31b1. Since the guide surface 44 is opposite the inlet 11i and the inlet passage 11d with respect to the cylinder arranging direction, the intake gas flows through the inlet 11i and the inlet passage 11d into the expansion chamber 11e in the intake gas distribution chamber 11 and can easily impinge on the guide surface 44.

The guide wall 40 is on the imaginary extension passage 22p of the branch intake passage 22c, which is the nearest to the end wall 13a and the corner part 31a among the four branch intake passages 22 (see FIGS. 1 and 3). If the guide wall 40 were formed integrally with the first section A, the guide wall 40 would obstruct drawing out the mold core for forming the branch intake passages 22 from the branch intake passages 22. This disadvantage can be eliminated in this invention.

A rib 45 having opposite ends respectively joined to the guide wall 40 and the corner part 31b is extended in the back space 47. The rib 45 enhances the rigidity of the plate-shaped guide wall 40 and suppresses the vibration of the guide wall caused by the variation of the pressure of the intake gas in the intake gas distribution chamber 11 to prevent noise generation.

The operation and effect of the intake manifold M in the preferred embodiment will be described.

The collective part 10 of the intake manifold M is formed by joining together the first section A and the second section B respectively defining the first space 11a and the second space 11b forming the intake gas distribution chamber 11. The first corner part 31a and the second corner part 31b forming the corner part 31 are formed integrally with the first section A and the second section B, respectively. The guide wall 40 is formed in the second section B so as to extend in the first space 11a and the second space 11b and so as to cover the respective inside surfaces 31a1 and 31b1 of the first corner part 31a and the second corner part 31b. The guide wall 40 has the guide surface 44 capable of guiding the intake gas more smoothly than the inside surfaces 31a and 31b. The collective part 10 of the intake manifold M is a split case structure formed by joining together the first section A and the second section B. Therefore, the guide wall 40 guides the intake gas so as to flow smoothly in the intake gas distribution chamber 11 regardless of the shape of the corner part 31 even though the first corner part 31a and the second corner part 31b are formed integrally with the first section A and the second section B, respectively, to enhance the rigidity of the collective part 10. Since the guide wall 40 extends in the first section A and the second section B, the intake gas can be made to flow smoothly in a wide region in the intake gas distribution chamber 11 and, consequently, the volumetric efficiency can be improved.

Since the guide wall 40 is formed integrally with only the second section B, the collective part 10 can be easily molded as compared with a case where the guide wall 40 is formed integrally with both the first section A and the second section B.

Since the guide wall 40 and the corner part 31 define the back space 47 communicating with the intake gas distribution chamber 11, the volume of the intake gas distribution chamber 11 is increased by the volume of the back space 47. The variation of pressure in the intake gas distribution chamber 11 can be suppressed by using the back space 47, which contribute to the improvement of volumetric efficiency.

The branch part 20 forming the branch intake passages 22 is formed integrally with the first section A, the guide wall 40 is on one of the imaginary extension passages 22 of the branch intake passages 22, and the corner part 31a of the first section A is disposed outside the imaginary extension passage 22p. Therefore, even though the branch part 20 forming the branch intake passages 22 is formed integrally with the first section A, the mold core for forming the branch intake passages 22 can be removed without being obstructed by the guide wall 40 and the corner part 31a of the first section A. Thus the mold for integrally forming the collective part 10 and the branch part 20 is not complicated, and hence it is possible to avoid increasing the cost of the intake manifold M.

Possible changes in the intake manifold M in the preferred embodiment will be described.

The present invention is applicable to multiple-cylinder internal combustion engines other than the four-cylinder internal combustion engine, and is applicable to V-type or flat internal combustion engines having banks each provided with a plurality of cylinders.

The predetermined number of the branch intake passages does not need necessarily equal to the number of cylinders of the internal combustion engine and may be smaller than the number of the cylinders.

Although the invention has been described as applied to the internal combustion engine for a vehicle, the present invention is applicable also to marine propulsion devices, such as an outboard motor provided with a vertical crankshaft.

The invention claimed is:

1. An intake manifold, for a multiple-cylinder internal combustion engine, having a collective part defining an intake gas distribution chamber having an intake gas inlet, and a branch intake part having a plurality of branch intake passages respectively for carrying an intake gas to combustion chambers of the engine, the engine having cylinders arranged in a cylinder arranging direction;

wherein the collective part is built by joining together first and second sections respectively defining first and second spaces forming the intake gas distribution chamber, at least the first section is integrally provided with a corner part, the second section is provided with a guide wall extending in the first and the second spaces and covering the inside surface of the corner part, the guide wall has a guide surface for guiding the intake gas more smoothly than the inside surface of the corner part, the guide wall opposing the intake gas inlet through the intake gas distribution chamber, wherein the intake gas distribution chamber is defined between the intake gas inlet and the guide wall such that the intake gas flowing along the cylinder arranging direction from the intake gas inlet through the intake gas distribution chamber impinges on the guide surface to be directed to the branch intake part, and wherein the guide wall and the corner part define therebetween a back space communicating with the intake gas distribution chamber by a gap defined between a free end of the guide wall and an inner surface of a wall of the first section.

2. The intake manifold, for a multiple-cylinder internal combustion engine, according to claim 1, wherein the branch intake part is formed integrally with the first section, the guide wall is on an imaginary extension passage on an extension of the branch intake passage, and the corner part of the first section is outside the imaginary extension passage.

3. The intake manifold according to claim 1, wherein the back space defines a volume smaller than a volume defined by the intake gas distribution chamber.

4. The intake manifold according to claim 1, further comprising a rib disposed in the back space, and having opposite ends joined to the guide wall and the corner part.

5. An intake manifold, for a multiple-cylinder internal combustion engine, having a collective part defining an intake gas distribution chamber having an intake gas inlet, and a branch intake part having a plurality of branch intake passages arranged in a direction respectively for carrying an intake gas to combustion chambers of the engine;

wherein the collective part is built by joining first and second sections respectively defining first and second spaces forming the intake gas distribution chamber, at least the first section is integrally provided with a corner part, the second section is provided with a guide wall extending in the first and second spaces and covering the inside surface of the corner part, the guide wall has a guide surface for guiding the intake gas more smoothly than the inside surface of the corner part, the intake gas inlet being positioned at one end part of the intake gas distribution chamber with respect to said direction, the guide surface being positioned at another end part of the intake gas distribution chamber with respect to said direction such that the intake gas flowing along said direction from the intake gas inlet through the intake gas distribution chamber impinges on the guide surface to be directed to the branch intake part, and wherein the guide wall and the corner part define therebetween a back space communicating with the intake gas distribution chamber by a gap defined between a free end of the guide wall and an inner surface of a wall of the first section.

6. The intake manifold according to claim 1, wherein said branch intake part is integrally formed with the first section, and said guide wall is disposed in an imaginary extension passage extending from a branch intake passage farthest from the intake gas inlet into the intake gas distribution chamber, and wherein the corner part is positioned outside the imaginary extension passage.

7. The intake manifold according to claim 5, wherein said branch intake part is integrally formed with the first section, and said guide wall is disposed in an imaginary extension passage extending from a branch intake passage farthest from the intake gas inlet into the intake gas distribution chamber, and wherein the corner part is positioned outside the imaginary extension passage.

8. The intake manifold according to claim 6, wherein the gap is disposed outside the imaginary extension passage.

9. The intake manifold according to claim 7, wherein the gap is disposed outside the imaginary extension passage.

* * * * *